United States Patent
Okamoto et al.

(10) Patent No.: US 11,402,118 B2
(45) Date of Patent: Aug. 2, 2022

(54) AIR-CONDITIONING SYSTEM

(71) Applicant: DAIKIN INDUSTRIES, LTD., Osaka (JP)

(72) Inventors: Yasunori Okamoto, Osaka (JP); Naotoshi Fujita, Osaka (JP); Kouji Tatsumi, Osaka (JP); Masaaki Kawagishi, Osaka (JP); Shinya Umase, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/536,684

(22) Filed: Nov. 29, 2021

(65) Prior Publication Data

US 2022/0082289 A1   Mar. 17, 2022

Related U.S. Application Data

(63) Continuation of application No. PCT/JP2020/019656, filed on May 18, 2020.

(30) Foreign Application Priority Data

May 31, 2019 (JP) .............................. JP2019-102256

(51) Int. Cl.
*F24F 11/81* (2018.01)
*F24F 3/14* (2006.01)
*F24F 110/10* (2018.01)

(52) U.S. Cl.
CPC ................ *F24F 11/81* (2018.01); *F24F 3/14* (2013.01); *F24F 2110/10* (2018.01)

(58) Field of Classification Search
CPC ........... F24F 11/81; F24F 3/14; F24F 2110/10
See application file for complete search history.

(56) References Cited

U.S. PATENT DOCUMENTS 11,293,655 B2 * 4/2022 Horie ..................... F24F 11/79
2015/0115047 A1 * 4/2015 Okamoto .............. F24F 11/70
236/1 E (Continued)

FOREIGN PATENT DOCUMENTS

JP     6-241536 A    8/1994
JP     8-178396 A    7/1996

(Continued)

OTHER PUBLICATIONS

Decision to Grant a Patent for Japanese Application No. 2019-102256, dated Dec. 24, 2020.

(Continued)

*Primary Examiner* — Nelson J Nieves
(74) *Attorney, Agent, or Firm* — Birch, Stewart, Kolasch & Birch, LLP

(57) ABSTRACT

It is an object of the present disclosure to collectively control an outdoor air handler and an air conditioner optimally.
An air-conditioning system (100) includes an outdoor air handler (10) configured to adjust a temperature and a humidity of taken-in outdoor air and supply the air to a target space (SP1, SP2), an air conditioner (20) configured to adjust a temperature of air in the target space (SP1, SP2), and a control unit (30). The control unit (30) is configured to, in a case where one of the outdoor air handler (10) and the air conditioner (20) is in a non-temperature adjusting state in which the temperature of the air is not adjusted, change an air conditioning capacity of the other one of the outdoor air handler (10) and the air conditioner (20) compared with a case where the outdoor air handler (10) and the air conditioner (20) are in a temperature adjusting state in which the temperature of the air is adjusted.

6 Claims, 5 Drawing Sheets

(56) References Cited

U.S. PATENT DOCUMENTS

| | | | |
|---|---|---|---|
| 2015/0316276 A1 | 11/2015 | Matsugi | |
| 2019/0353375 A1* | 11/2019 | Brahme | F24F 11/65 |
| 2019/0376697 A1* | 12/2019 | Ray | F24F 13/20 |
| 2020/0018513 A1* | 1/2020 | Hamada | F24F 3/001 |
| 2020/0080742 A1 | 3/2020 | Okamoto et al. | |
| 2020/0132321 A1* | 4/2020 | Blanton | F24F 11/36 |

FOREIGN PATENT DOCUMENTS

| | | |
|---|---|---|
| JP | 9-329371 A | 12/1997 |
| JP | 2005-156148 A | 6/2005 |
| JP | 2014-134343 A | 7/2014 |
| JP | 2015-28391 A | 2/2015 |
| JP | 2017-142003 A | 8/2017 |
| JP | 2018-173264 A | 11/2018 |
| WO | WO 2006/054586 A1 | 5/2006 |

OTHER PUBLICATIONS

International Search Report, issued in PCT/JP2020/019656, PCT/ISA/210, dated Aug. 18, 2020.

Notice of Reasons for Refusal for Japanese Application No. 2019-102256, dated Aug. 6, 2020.

English translation of the International Preliminary Report on Patentability and Written Opinion of the International Searching Authority for International Application No. PCT/JP2020/019656, dated Dec. 9, 2021.

* cited by examiner

AIR-CONDITIONING SYSTEM

CROSS REFERENCE TO RELATED APPLICATIONS

This application is a Continuation of PCT International Application No. PCT/JP2020/019656 filed on May 18, 2020, which claims priority under 35 U.S.C. § 119(a) to Patent Application No. 2019-102256 filed in Japan on May 31, 2019, all of which are hereby expressly incorporated by reference into the present application.

TECHNICAL FIELD

The present disclosure relates to an air-conditioning system.

BACKGROUND ART

An air-conditioning system including an air conditioner having a defrosting operation function and a heat exchange ventilator capable of operating together with the air conditioner has been hitherto known (for example, PTL 1). The heat exchange ventilator of PTL 1 includes an air supply fan, an air discharge fan, and a heat exchange element that enables heat exchange between outdoor air and indoor air. The air-conditioning system of PTL 1 is configured to suppress an operation of each of the fans of the heat exchange ventilator in the case where the air conditioner performs a defrosting operation.

CITATION LIST

Patent Literature

PTL 1: Japanese Unexamined Patent Application Publication No. 8-178396

SUMMARY

A first aspect of the present disclosure is directed to an air-conditioning system (100) including an outdoor air handler (10) configured to adjust a temperature and a humidity of taken-in outdoor air and supply the air to a target space (SP1, SP2), and an air conditioner (20) configured to adjust a temperature of air in the target space (SP1, SP2). The air-conditioning system (100) includes a control unit (30) configured to, in a case where one of the outdoor air handler (10) and the air conditioner (20) is in a non-temperature adjusting state in which the temperature of the air is not adjusted, change an air conditioning capacity of the other one of the outdoor air handler (10) and the air conditioner (20) compared with a case where the outdoor air handler (10) and the air conditioner (20) are in a temperature adjusting state in which the temperature of the air is adjusted.

DESCRIPTION OF EMBODIMENTS

Embodiments of the present disclosure will be described below with reference to the drawings. Note that the embodiments below are a preferable example in essence and do not intend to limit the scope of the present invention and of the applications or uses thereof.

<Configuration of Air-Conditioning System>

Figure 1:
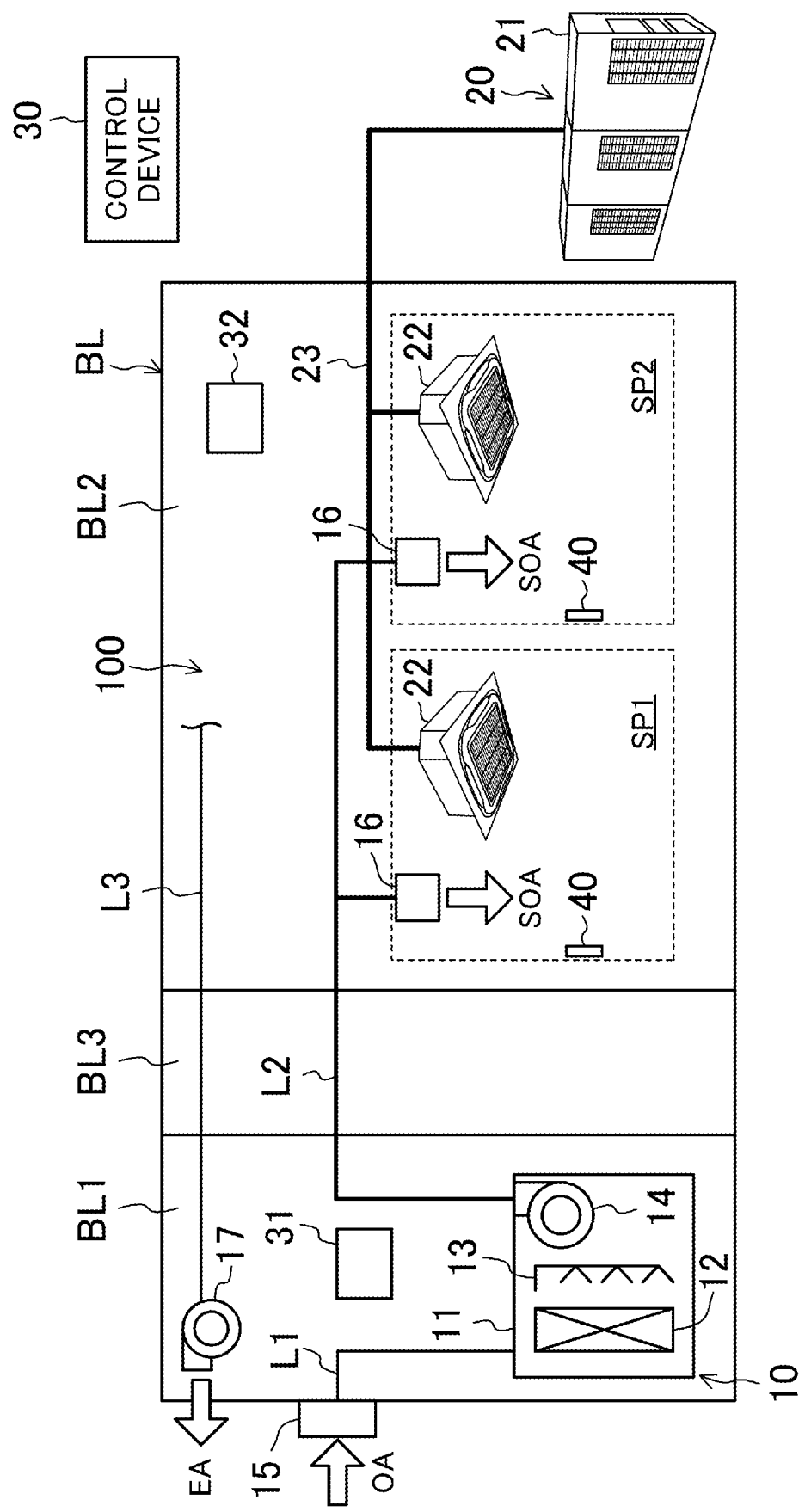
FIG. 1 is a diagram illustrating an example of a configuration of an air-conditioning system according to an embodiment.

As illustrated in FIG. 1, an air-conditioning system (100) is a system that implements air conditioning in a target space included in a structure such as a house, a building, a factory, or a public facility.

In the present embodiment, the air-conditioning system (100) is employed in a building (BL) including a plurality of (for example, two) target spaces (SP1, SP2). The plurality of target spaces (SP1, SP2) may be separated indoor spaces or different spaces in the same room. The building (BL) includes a machine chamber (BL1) in which an outdoor air handler (10) described later is disposed, an exclusively used section (BL2) where the target spaces (SP1, SP2) are present, and a hallway (BL3) located between the machine chamber (BL1) and the exclusively used section (BL2).

As illustrated in FIG. 1, the air-conditioning system (100) includes the outdoor air handler (10), an air conditioner (20), and a control device (30). The outdoor air handler (10) adjusts a temperature and a humidity of taken-in outdoor air (OA) and supplies the air to the target spaces (SP1, SP2). The outdoor air (OA) is air outside the target spaces (SP1, SP2) (in this example, air outside the building (BL)). The air conditioner (20) adjusts a temperature of air (indoor air) in the target spaces (SP1, SP2). The control device (30) constitutes a control unit.

In the air-conditioning system (100), in response to input of an appropriate command to a remote control (40) installed in the target space (SP1, SP2), operating states of the outdoor air handler (10) and the air conditioner (20) can be switched. The control device (30) controls the operating states of the outdoor air handler (10) and the air conditioner (20) in accordance with a command (command for on/off, an operating mode, a set temperature, a set air flow rate, or the like) input to the remote control (40), the temperature and the humidity of the outdoor air (OA), and the temperature and the humidity of the indoor air, etc.

<Configuration of Outdoor Air Handler>

The outdoor air handler (10) mainly includes an air handling unit (11) (hereinafter, referred to as "AHU"), and a chiller unit (not illustrated) that serves as a heat source unit. The AHU (11) may be of a water type or a refrigerant type (direct-expansion AHU).

While operating, the outdoor air handler (10) takes outdoor air (OA) from an air intake port (15) provided on an outer wall of the building (BL) into the AHU (11) through an air intake duct (L1). The outdoor air handler (10) cools or heats, or dehumidifies or humidifies the taken-in outdoor air (OA), and supplies, as to-be-supplied air (SOA), the air to the target spaces (SP1, SP2) from air supply ports (16) through an air supply duct (L2).

The outdoor air handler (10) releases, by using an air discharge fan (17), to-be-discharged air (EA) to outside the building (BL) from air discharge ports (not illustrated) of the target spaces (SP1, SP2) through an air discharge duct (L3).

The AHU (11) mainly includes an outdoor air heat exchanger (12), a humidifier (13), and an air supply fan (14). The outdoor air heat exchanger (12) includes a heat transfer tube and a heat transfer fin. In the outdoor air heat exchanger (12), heat is exchanged between the outdoor air (OA) that passes around the heat transfer tube and the heat transfer fin and a heat medium that passes through the heat transfer tube. The humidifier (13) humidifies the outdoor air (OA) that has passed around the outdoor air heat exchanger (12). The scheme and the type of the humidifier (13) are not limited. For example, a common humidifier of a naturally evaporating type (evaporative type) may be used. The air supply fan (14) is a fan that takes the outdoor air (OA) into the AHU (11) and sends the outdoor air (OA) to the air supply duct (L2). The type of the air supply fan (14) is not limited. For example, a sirocco fan may be used. The air supply fan (14) includes a fan motor. Inverter control is performed on the fan motor, so that the number of rotations is adjusted. Thus, the air supply fan (14) has a variable air flow rate.

In the AHU (11), various sensors such as, for example, an outdoor air temperature sensor and an outdoor air humidity sensor that respectively detect a temperature and a humidity of the outdoor air (OA) taken into the AHU (11) and a to-be-supplied air temperature sensor that detects a temperature (to-be-supplied air temperature) of the to-be-supplied air (SOA) sent to the air supply duct (L2) (to the target spaces (SP1, SP2)) are disposed.

The air supply duct (L2) is a member that forms a channel for the outdoor air (OA). One end of the air supply duct (L2) is connected to the AHU (11) so that the outdoor air (OA) flows thereinto when the air supply fan (14) operates. The other end of the air supply duct (L2) splits into a plurality of branches. Each of the branches communicates with a corresponding one of the target spaces (SP1, SP2). Specifically, the other end (each of the branches) of the air supply duct (L2) is connected to the air supply port (16) formed on the ceiling of the target space (SP1, SP2).

The outdoor air handler (10) includes an outdoor-air-handler control unit (31) that controls an operation of each component of the outdoor air handler (10). The outdoor-air-handler control unit (31) is constituted by a CPU, a memory, various electric components, etc. The outdoor-air-handler control unit (31) is connected to the devices included in the outdoor air handler (10) through wires. The outdoor-air-handler control unit (31) is electrically connected to the control device (30) and the remote controls (40) through communication lines. In the present embodiment, microcomputers and electric components disposed in the AHU (11) and the chiller unit are electrically connected to each other. In this manner, the outdoor-air-handler control unit (31) is configured.

The outdoor-air-handler control unit (31) sets a target value of a to-be-supplied air temperature in accordance with a set temperature or the like, and appropriately adjusts an operation of each component on the basis of the target value. In this manner, an operating capacity (air conditioning capacity) of the outdoor air handler (10) is appropriately changed. Note that the target value of the to-be-supplied air temperature may be set by the control device (30).

<Configuration of Air Conditioner>

The air conditioner (20) includes a refrigerant circuit (20*a*). The air conditioner (20) performs a vapor-compression-type refrigeration cycle by causing refrigerant to circulate through the refrigerant circuit (20*a*) so as to implement air conditioning such as cooling, dehumidification, or heating in the target spaces (SP1, SP2). The air conditioner (20) has a plurality of operating modes and operates in accordance with the operating modes. Specifically, the air conditioner (20) performs operations such as a cooling operation for cooling, a heating operation for heating, and a defrosting operation for defrosting.

The air conditioner (20) mainly includes a single outdoor unit (21) that serves as a heat source unit, and a plurality of (for example, two) indoor units (22). The type of the air conditioner (20) is not limited. For example, a variable refrigerant volume (VRV) type may be used.

Figure 2:
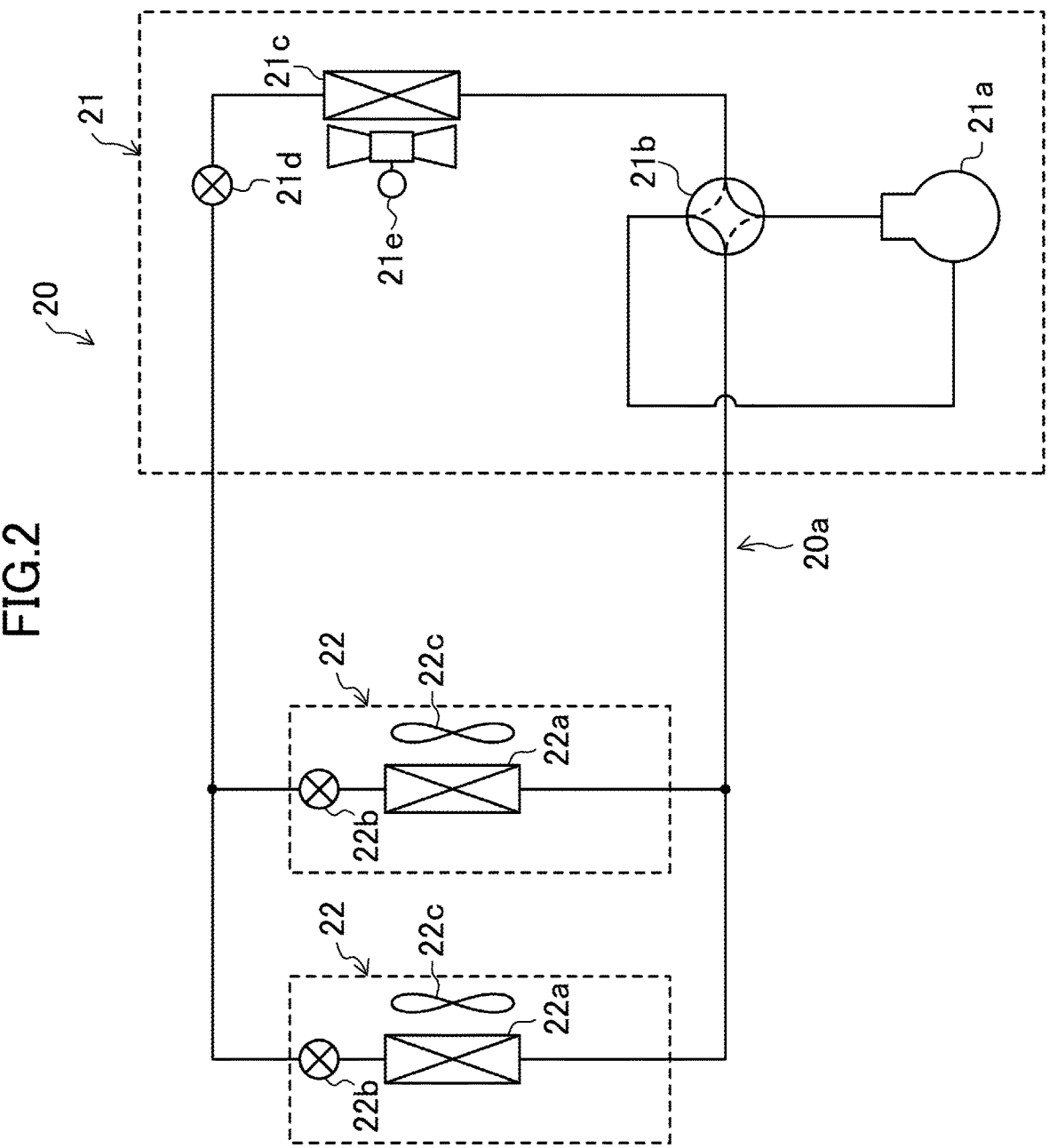
FIG. 2 is a refrigerant circuit diagram illustrating an example of a configuration of an air conditioner.

In the air conditioner (20), the outdoor unit (21) and each of the indoor units (22) are connected to each other through a connection pipe (23), so that the refrigerant circuit (20*a*) illustrated in FIG. 2 is formed. The kind of the refrigerant sealed in the refrigerant circuit (20*a*) is not limited. For example, HFC refrigerant such as R32 or R410A may be used.

The outdoor unit (21) is disposed outside the target spaces (SP1, SP2) (in this example, outside the building (BL)). The outdoor unit (21) mainly includes a compressor (21*a*), a four-way switching valve (21*b*), an outdoor heat exchanger (21*c*), an outdoor expansion valve (21*d*), and an outdoor fan (21*e*). The compressor (21*a*) is a device that compresses low-pressure refrigerant in the refrigeration cycle to have a high pressure. The four-way switching valve (21*b*) is a channel switching means for switching a flow direction of the refrigerant in the refrigerant circuit (20*a*). The outdoor heat exchanger (21*c*) is a heat exchanger that enables heat exchange between a passing air flow (outdoor air flow generated by the outdoor fan (21*e*)) and the refrigerant. The outdoor heat exchanger (21*c*) functions as an evaporator of the refrigerant during a forward cycle operation (heating operation) and functions as a condenser or a radiator of the refrigerant during a reverse cycle operation (cooling operation or defrosting operation). The outdoor expansion valve (21*d*) is a valve that functions as a pressure reducing means or a flow rate adjusting means for the refrigerant, for example, an electrically powered expansion valve capable of controlling an opening degree, and is disposed between the outdoor heat exchanger (21*c*) and a liquid side connection pipe. The outdoor fan (21*e*) is a fan that generates the outdoor air flow. The outdoor air flow is a flow of outdoor air that flows into the outdoor unit (21), passes around the outdoor heat exchanger (21*c*), and flows out to the outside of the outdoor unit (21). The outdoor air flow is a heating source of the refrigerant in the outdoor heat exchanger (21*c*) during the forward cycle operation and is a cooling source of the refrigerant in the outdoor heat exchanger (21*c*) during the reverse cycle operation. The outdoor fan (21*e*) includes a fan motor. Inverter control is performed on the fan motor, so that the number of rotations is adjusted. Thus, the outdoor fan (21*e*) has a variable air flow rate.

In the outdoor unit (21), various sensors such as, for example, a suction pressure sensor that detects a pressure of the refrigerant sucked to the compressor (21*a*) and a discharge pressure sensor that detects a pressure of the refrigerant discharged from the compressor (21*a*) are disposed.

Each of the indoor units (22) is disposed in a corresponding target space (SP1, SP2). In the present embodiment, the two indoor units (22) are connected in parallel with each other to the single outdoor unit (21). The type of each of the indoor units (22) is not limited. For example, a ceiling-embedded type that is installed at the ceiling of the target space (SP1, SP2) may be used. In this case, each of the indoor units (22) is installed in the corresponding target space (SP1, SP2) such that an intake port and a blow-out port are exposed from the ceiling.

Each of the indoor units (22) mainly includes an indoor heat exchanger (22a), an indoor expansion valve (22b), and an indoor fan (22c). The indoor heat exchanger (22a) is a heat exchanger that enables heat exchange between a passing air flow (indoor air flow generated by the indoor fan (22c)) and the refrigerant. The indoor heat exchanger (22a) functions as a condenser or a radiator of the refrigerant during the forward cycle operation and functions as an evaporator of the refrigerant during the reverse cycle operation. The indoor expansion valve (22b) is a valve that functions as a pressure-reducing means or a flow rate adjusting means for the refrigerant, for example, an electrically powered expansion valve capable of controlling an opening degree, and is disposed between the indoor heat exchanger (22a) and the liquid side connection pipe. The indoor fan (22c) is a fan that generates the indoor air flow. The indoor air flow is a flow of indoor air that flows into the indoor unit (22), passes around the indoor heat exchanger (22a), and flows out to the outside of the indoor unit (22). The indoor air flow is a cooling source of the refrigerant in the indoor heat exchanger (22a) during the forward cycle operation and is a heating source of the refrigerant in the indoor heat exchanger (22a) during the reverse cycle operation. The indoor fan (22c) includes a fan motor. Inverter control is performed on the fan motor, so that the number of rotations is adjusted. Thus, the indoor fan (22c) has a variable air flow rate.

In each of the indoor units (22), various sensors such as, for example, an indoor temperature sensor, an indoor humidity sensor, and a $CO_2$ concentration sensor that respectively detect a temperature, a humidity, and a $CO_2$ concentration of the indoor air flow (indoor air) sucked to the indoor unit (22) and a refrigerant temperature sensor that detects a temperature of the refrigerant in the indoor heat exchanger (22a) may be disposed.

The air conditioner (20) includes an air-conditioner control unit (32) that controls an operation of each component of the air conditioner (20). The air-conditioner control unit (32) is constituted by a CPU, a memory, various electric components, etc. The air-conditioner control unit (32) is connected to the devices included in the air conditioner (20) through wires. The air-conditioner control unit (32) is electrically connected to the various sensors disposed in each of the indoor units (22). The air-conditioner control unit (32) is communicably connected to the remote controls (40) installed in the target spaces (SP1, SP2). The air-conditioner control unit (32) is electrically connected to the control device (30) and the remote controls (40) through communication lines.

In the present embodiment, microcomputers and electric components disposed in the outdoor unit (21) and the indoor units (22) are electrically connected to each other. In this manner, the air-conditioner control unit (32) is configured. The air-conditioner control unit (32) sets a target value of an evaporation temperature in each of the indoor units (22) in accordance with a set temperature and an indoor temperature, and appropriately adjusts a capacity of the compressor (21a) and an air flow rate of the outdoor fan (21e) on the basis of the target value. In this manner, an operating capacity (air conditioning capacity) of the air conditioner (20) is appropriately changed. Note that the target value of the evaporation temperature may be set by the control device (30).

<Control Device and Remote Controls>

The control device (30) is a functional unit that comprehensively controls an operation of the air-conditioning system (100). Specifically, the control device (30) includes a computer constituted by a memory, a CPU, and so on. The computer executes a program, so that each function of the air-conditioning system (100) is implemented. The program is recorded on a computer-readable recording medium, for example, a ROM or the like.

The control device (30) is electrically connected to the outdoor-air-handler control unit (31) and the air-conditioner control unit (32). The control device (30), the outdoor-air-handler control unit (31), and the air-conditioner control unit (32) transmit and receive signals to and from each other. The control device (30) transmits a predetermined signal (for example, a control signal for setting a target to-be-supplied air temperature or a target evaporation temperature) to the outdoor-air-handler control unit (31) and the air-conditioner control unit (32), so as to be able to control operations of the devices that constitute each of the outdoor air handler (10) and the air conditioner (20). The control device (30) is capable of acquiring detected values obtained by the various sensors disposed in each of the outdoor air handler (10) and the air conditioner (20) and information for identifying an operating state of each of the outdoor air handler (10) and the air conditioner (20).

The remote control (40) is an input device used by a user to input various commands for individually switching the operating states (such as on/off, the operating mode, the set temperature, the set humidity, and the set air flow rate) of the outdoor air handler (10) and the air conditioner (20). The remote control (40) also functions as a display device for displaying predetermined information (such as the operating states of the outdoor air handler (10) and the air conditioner (20), the temperature and the humidity of the indoor air, and the temperature and the humidity of the outdoor air, for example).

<Operations of Air-Conditioning System>

Operations of the air-conditioning system (100) will be described. The air-conditioning system (100) according to the present embodiment is capable of selectively performing a common operation and a mixed operation. The operations are selected by the control device (30).

<<Common Operation>>

The common operation is an operation in which the outdoor air handler (10) and the air conditioner (20) perform an identical operation from among a cooling operation and a heating operation. That is, in the common operation, the outdoor air handler (10) and the air conditioner (20) perform the cooling operation, or the outdoor air handler (10) and the air conditioner (20) perform the heating operation. Dehumidification may be or may not be performed in the cooling operation, and humidification may be or may not be performed in the heating operation (the same applies to below).

In the common operation, the air-conditioning system (100) enters different operating modes in the case where the outdoor air handler (10) and the air conditioner (20) are in a temperature adjusting state and in the case where one of the outdoor air handler (10) and the air conditioner (20) is in a non-temperature adjusting state. The temperature adjusting state is a state in which the temperature in the target space (SP1, SP2) is adjusted. The non-temperature adjusting state is a state in which the temperature in the target space (SP1, SP2) is not adjusted (or cannot be adjusted).

In the common operation, in the case where the outdoor air handler (10) and the air conditioner (20) are in the temperature adjusting state, the air-conditioning system (100) appropriately adjusts the operating capacities (air conditioning capacities) of the outdoor air handler (10) and the air conditioner (20) so as to perform air conditioning in the target spaces (SP1, SP2). In this case, the air-conditioning system (100) can make full use of the load processing capacity thereof as required.

In the common operation, in the case where one of the outdoor air handler (10) and the air conditioner (20) is in the non-temperature adjusting state, on the other hand, the air-conditioning system (100) appropriately adjusts the operating capacity (air conditioning capacity) of the other one so as to perform air conditioning in the target spaces (SP1, SP2). In this case, the load processing capacity of the air-conditioning system (100) is limited by the load processing capacity of the other one of the outdoor air handler (10) and the air conditioner (20).

—In Case where Air Conditioner Enters Non-Temperature Adjusting State—

As a specific example, an operation in the case where the air conditioner (20) enters the non-temperature adjusting state from the temperature adjusting state in the common operation in which the outdoor air handler (10) and the air conditioner (20) perform the heating operation will be described with reference to FIG. 3. The flowchart of FIG. 3 assumes, as the initial state, a state in which the outdoor air handler (10) and the air conditioner (20) are in the temperature adjusting state.

Figure 3:
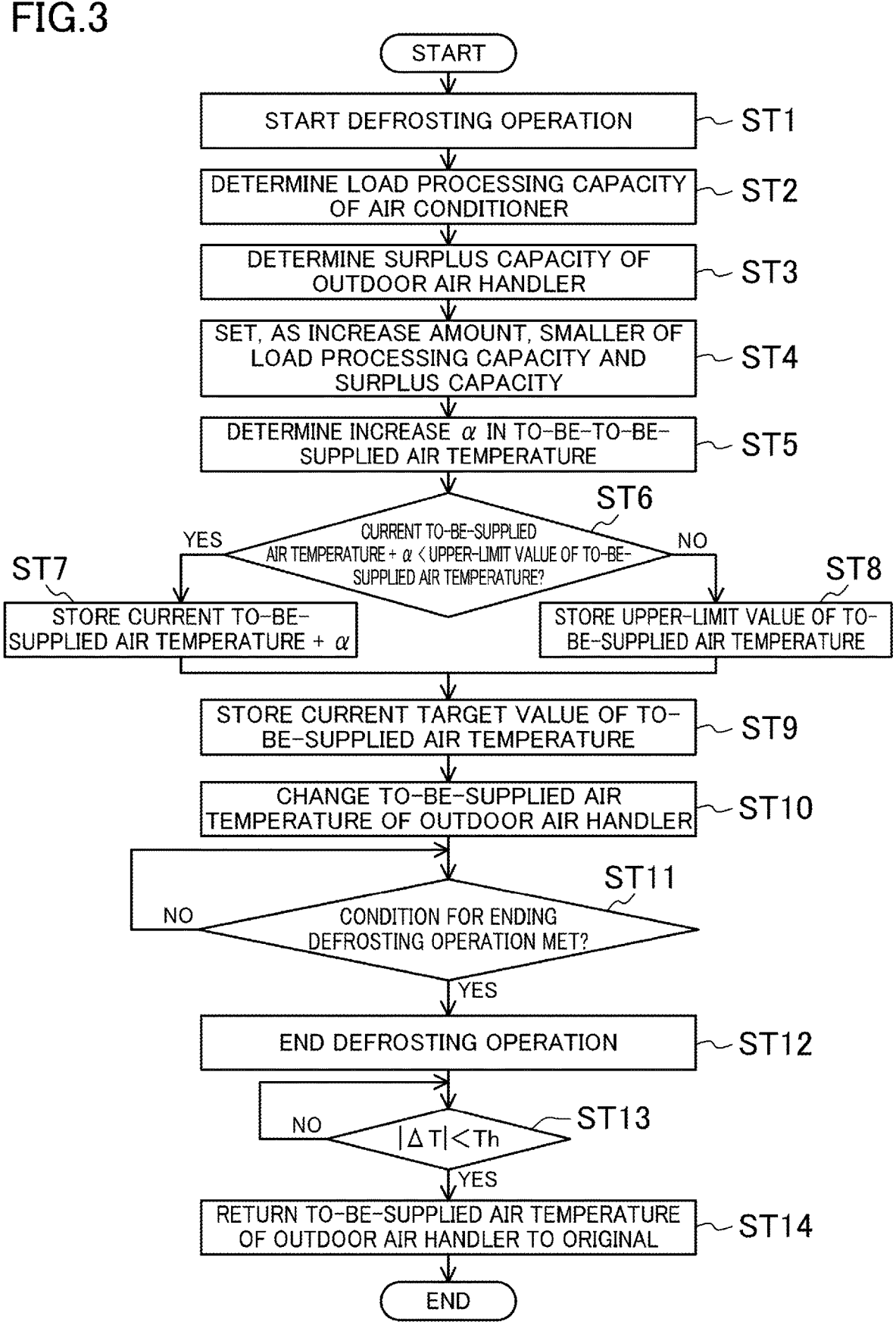
FIG. 3 is a flowchart for describing an example of a control operation of the air-conditioning system.

As illustrated in FIG. 3, in step ST1, the control device (30) causes the air conditioner (20) to start a defrosting operation. Consequently, the air conditioner (20) enters the non-temperature adjusting state from the temperature adjusting state. The process then proceeds to step ST2.

In step ST2, the control device (30) determines the load processing capacity of the air conditioner (30) before the air conditioner (20) starts the defrosting operation (the load processing capacity of the air conditioner (20) in the temperature adjusting state). This load processing capacity can be determined as a heat quantity processed by the air conditioner (20) before the defrosting operation is started. The process then proceeds to step ST3.

In step ST3, the control device (30) determines a surplus capacity of the heat source unit (chiller unit) of the outdoor air handler (10). This surplus capacity can be determined from the maximum capacity of the heat source unit and the heating capacity currently exhibited by the heat source unit. The process then proceeds to step ST4.

In step ST4, the control device (30) sets, as an increase amount of the air conditioning capacity of the outdoor air handler (10), the smaller of the load processing capacity of the air conditioner (20) determined in step ST2 and the surplus capacity of the outdoor air handler (10) determined in step ST3. The process then proceeds to step ST5.

In step ST5, the control device (30) determines an increase α in a to-be-supplied air temperature of the outdoor air handler (10). This increase α can be determined on the basis of the increase amount of the air conditioning capacity of the outdoor air handler (10) set in step ST4 and the current air flow rate of the outdoor air handler (10) such that the temperature of the air in the target space (SP1, SP2) approaches the temperature target value. The process then proceeds to step ST6.

In step ST6, the control device (30) determines whether a value obtained by adding the increase α to the current to-be-supplied air temperature of the outdoor air handler (10) is less than an upper-limit value of the to-be-supplied air temperature of the outdoor air handler (10). If the former value is less than the latter value, the process proceeds to step ST7; otherwise, the process proceeds to step ST8.

In step ST7, the control device (30) stores the value obtained by adding the increase α to the current to-be-supplied air temperature of the outdoor air handler (10). The process then proceeds to step ST9.

On the other hand, in step ST8, the control device (30) stores the upper-limit value of the to-be-supplied air temperature of the outdoor air handler (10). The process then proceeds to step ST9.

In step ST9, the control device (30) stores the current target value of the to-be-supplied air temperature of the outdoor air handler (10). The process then proceeds to step ST10.

In step ST10, the control device (30) changes the target value of the to-be-supplied air temperature of the outdoor air handler (10) to the value stored in step ST7 or step ST8. The process then proceeds to step ST11.

In step ST11, the control device (30) determines whether a condition for ending the defrosting operation performed by the air conditioner (20) is met. If the condition for ending the defrosting operation is not met, step ST11 is repeated. On the other hand, if the condition for ending the defrosting operation is met, the process proceeds to step ST12.

In step ST12, the control device (30) ends the defrosting operation performed by the air conditioner (20), and the air conditioner (20) resumes the heating operation. Consequently, the air conditioner (20) enters the temperature adjusting state from the non-temperature adjusting state. The process then proceeds to step ST13.

In step ST13, the control device (30) determines whether a difference ($\Delta T$) between the temperature (indoor temperature) of the air in the target space (SP1, SP2) and the target value (temperature target value) of the indoor temperature is less than a predetermined temperature threshold (Th) (for example, 1 to 3° C.). If the difference ($\Delta T$) is greater than or equal to the temperature threshold (Th), step ST13 is repeated; otherwise, the process proceeds to step ST14. That is, even if the non-temperature adjusting state of the air conditioner (20) ends, the control device (30) maintains the increased air conditioning capacity of the outdoor air handler (10) until the difference ($\Delta T$) becomes less than the temperature threshold (Th). Step ST13 may be omitted.

In step ST14, the control device (30) changes the target value of the to-be-supplied air temperature of the outdoor air handler (10) to the value stored in step ST9 (the value set before the change). That is, after the non-temperature adjusting state of the air conditioner (20) ends, the control device (30) returns the air conditioning capacity of the outdoor air handler (10) to the air conditioning capacity set before the change.

—In Case where Outdoor Air Handler Enters Non-Temperature Adjusting State—

As another specific example, an operation in the case where the outdoor air handler (10) enters the non-temperature adjusting state from the temperature adjusting state in the common operation in which the outdoor air handler (10) and the air conditioner (20) perform the cooling operation will be described.

First, in response to the outdoor air handler (10) entering the non-temperature adjusting state from the state in which the outdoor air handler (10) and the air conditioner (20) are in the temperature adjusting state, the control device (30) determines a load processing capacity of the outdoor air handler (10) before the state change.

The control device (30) then determines a surplus capacity of the heat source unit (the outdoor unit (21)) of the air conditioner (20). The control device (30) sets, as an increase amount of the air conditioning capacity of the air conditioner (20), the smaller of the surplus capacity of the outdoor unit

(21) and the load processing capacity of the outdoor air handler (10) determined above.

To increase the air conditioning capacity of the air conditioner (20) by the increase amount, the control device (30) then decreases the evaporation temperature (specifically, the target value of the evaporation temperature) in the indoor heat exchanger (22a). The control device (30) stores the target value of the evaporation temperature set before the change.

After the outdoor air handler (10) returns from the non-temperature adjusting state to the temperature adjusting state, the control device (30) returns the target value of the evaporation temperature to the target value of the evaporation temperature set before the change. Even after the non-temperature adjusting state of the outdoor air handler (10) ends, if the difference (ΔT) between the temperature (indoor temperature) of the air in the target space (SP1, SP2) and the temperature target value is not less than the predetermined temperature threshold (Th), the decreased target value of the evaporation temperature may be maintained until the difference (ΔT) becomes less than the temperature threshold (Th).

To increase the air conditioning capacity of the air conditioner (20), the control device (30) may increase the air flow rate of the indoor fan (22c) instead of or in addition to changing the target value of the evaporation temperature of the indoor heat exchanger (22a).

When the indoor temperature is lower than the temperature target value by a predetermined value (for example, 0 to 3° C.) or more, the control device (30) does not increase the air conditioning capacity of the air conditioner (20). Specifically, when the indoor temperature is lower than the temperature target value by the predetermined value or more, the control device (30) does not change the target value of the evaporation temperature of the indoor heat exchanger (22a) and the air flow rate of the indoor fan (22c) from the values set when the outdoor air handler (10) is in the temperature adjusting state.

<<Mixed Operation>>

The mixed operation is an operation in which the outdoor air handler (10) and the air conditioner (20) respectively perform one of the cooling operation and the heating operation and the other one of the cooling operation and the heating operation. That is, in the mixed operation, the outdoor air handler (10) performs the cooling operation and the air conditioner (20) performs the heating operation, or the outdoor air handler (10) performs the heating operation and the air conditioner (20) performs the cooling operation.

In the mixed operation, the air-conditioning system (100) enters different operating modes in the case where the outdoor air handler (10) and the air conditioner (20) are in the temperature adjusting state and in the case where one of the outdoor air handler (10) and the air conditioner (20) is in the non-temperature adjusting state.

In the mixed operation, in the case where the outdoor air handler (10) and the air conditioner (20) are in the temperature adjusting state, the air-conditioning system (100) appropriately adjusts the operating capacities (air conditioning capacities) of the outdoor air handler (10) and the air conditioner (20) so as to perform air conditioning in the target spaces (SP1, SP2). In the mixed operation, in the case where one of the outdoor air handler (10) and the air conditioner (20) is in the non-temperature adjusting state, on the other hand, the air-conditioning system (100) appropriately adjusts the operating capacity (air conditioning capacity) of the other one so as to perform air conditioning in the target spaces (SP1, SP2).

—In Case where Air Conditioner Enters Non-Temperature Adjusting State—

As a specific example, an operation in the case where the air conditioner (20) enters the non-temperature adjusting state from the temperature adjusting state in the mixed operation in which the outdoor air handler (10) performs the heating operation and the air conditioner (20) performs the cooling operation will be described.

First, in response to the air conditioner (20) entering the non-temperature adjusting state from the state in which the outdoor air handler (10) and the air conditioner (20) are in the temperature adjusting state, the control device (30) determines the load processing capacity of the air conditioner (20) before the state change.

The control device (30) then determines the current load processing capacity of the heat source unit (chiller unit) of the outdoor air handler (10). The control device (30) sets, as a decrease amount of the air conditioning capacity of the outdoor air handler (10), the smaller of the load processing capacity of the air conditioner (20) before the state change and the current load processing capacity of the outdoor air handler (10).

To decrease the air conditioning capacity of the outdoor air handler (10) by the decrease amount, the control device (30) then decreases the to-be-supplied air temperature of the outdoor air handler (10). The control device (30) stores the to-be-supplied air temperature of the outdoor air handler (10) set before the change.

After the air conditioner (20) returns from the non-temperature adjusting state to the temperature adjusting state, the control device (30) returns the to-be-supplied air temperature of the outdoor air handler (10) to the to-be-supplied air temperature set before the change (specifically, increases the to-be-supplied air temperature). Even after the non-temperature adjusting state of the air conditioner (20) ends, if the difference (ΔT) between the temperature (indoor temperature) of the air in the target space (SP1, SP2) and the temperature target value is not less than the predetermined temperature threshold (Th), the decreased to-be-supplied air temperature of the outdoor air handler (10) may be maintained until the difference (ΔT) becomes less than the temperature threshold (Th).

To decrease the air conditioning capacity of the outdoor air handler (10), the control device (30) may decrease the air flow rate of the outdoor air handler (10) instead of or in addition to changing the to-be-supplied air temperature of the outdoor air handler (10).

—In Case where Outdoor Air Handler Enters Non-Temperature Adjusting State—

As another specific example, an operation in the case where the outdoor air handler (10) enters the non-temperature adjusting state from the temperature adjusting state in the mixed operation in which the outdoor air handler (10) performs the cooling operation and the air conditioner (20) performs the heating operation will be described.

First, in response to the outdoor air handler (10) entering the non-temperature adjusting state from the state in which the outdoor air handler (10) and the air conditioner (20) are in the temperature adjusting state, the control device (30) determines the load processing capacity of the outdoor air handler (10) before the state change.

The control device (30) then determines the current load processing capacity of the heat source unit (the outdoor unit (21)) of the air conditioner (20). The control device (30) sets, as a decrease amount of the air conditioning capacity of the air conditioner (20), the smaller of the load processing capacity of the outdoor air handler (10) before the state change and the current load processing capacity of the air conditioner (20).

To decrease the air conditioning capacity of the air conditioner (20) by the decrease amount above, the control device (30) then decreases the condensation temperature (specifically, the target value of the condensation temperature) in the indoor heat exchanger (22a). The control device (30) stores the target value of the condensation temperature set before the change.

After the outdoor air handler (10) returns from the non-temperature adjusting state to the temperature adjusting state, the control device (30) returns the target value of the condensation temperature to the target value of the condensation temperature set before the change. Even after the non-temperature adjusting state of the outdoor air handler (10) ends, if the difference ($\Delta T$) between the temperature (indoor temperature) of the air in the target space (SP1, SP2) and the temperature target value is not less than the predetermined temperature threshold (Th), the decreased target value of the condensation temperature may be maintained until the difference ($\Delta T$) becomes less than the temperature threshold (Th).

To decrease the air conditioning capacity of the air conditioner (20), the control device (30) may decrease the air flow rate of the indoor fan (22c) instead of or in addition to changing the target value of the condensation temperature in the indoor heat exchanger (22a).

Advantages of Embodiment 1

The air-conditioning system (100) according to the present embodiment includes the outdoor air handler (10) configured to adjust a temperature and a humidity of taken-in outdoor air and supply the air to the target space (SP1, SP2); the air conditioner (20) configured to adjust a temperature of air in the target space (SP1, SP2); and the control device (30) configured to, in the case where one of the outdoor air handler (10) and the air conditioner (20) is in the non-temperature adjusting state in which the temperature of the air is not adjusted, change the air conditioning capacity of the other one of the outdoor air handler (10) and the air conditioner (20) compared with the case where the outdoor air handler (10) and the air conditioner (20) are in the temperature adjusting state in which the temperature of the air is adjusted. Thus, the temperature in the target space (SP1, SP2) is adjusted by the outdoor air handler (10) and the air conditioner (20). In response to one of the outdoor air handler (10) and the air conditioner (20) entering the non-temperature adjusting state, the control device (30) changes the air conditioning capacity of the other one compared with the case where both are in the temperature adjusting state. For example, in response to the outdoor air handler (10) entering the non-temperature adjusting state, the control device (30) changes the air conditioning capacity of the air conditioner (20). Thus, the outdoor air handler (10) and the air conditioner (20) can be collectively controlled optimally.

In the air-conditioning system (100) according to the present embodiment, in the case where the outdoor air handler (10) and the air conditioner (20) perform an identical operation that is the cooling operation or the heating operation, when the one of the outdoor air handler (10) and the air conditioner (20) is in the non-temperature adjusting state, the control device (30) increases the air conditioning capacity of the other one of the outdoor air handler (10) and the air conditioner (20) compared with the case where the outdoor air handler (10) and the air conditioner (20) are in the temperature adjusting state. Thus, in response to the one of the outdoor air handler (10) and the air conditioner (20) entering the non-temperature adjusting state, the air conditioning capacity of the other one increases compared with the case where both are in the temperature adjusting state. Consequently, a shortage of the air conditioning capacity caused as a result of the one of the outdoor air handler (10) and the air conditioner (20) entering the non-temperature adjusting state is partially or entirely compensated for by the other one.

In the air-conditioning system (100) according to the present embodiment, after the non-temperature adjusting state of the one of the outdoor air handler (10) and the air conditioner (20) ends, the control device (30) returns the air conditioning capacity of the other one of the outdoor air handler (10) and the air conditioner (20) to an air conditioning capacity set before the change. Thus, after the non-temperature adjusting state of the one of the outdoor air handler (10) and the air conditioner (20) ends, an operating state of the other one is returned to an operating state set in the case where both are in the temperature adjusting state. Consequently, unnecessary power consumption can be suppressed.

In the air-conditioning system (100) according to the present embodiment, in the case of changing the air conditioning capacity of the outdoor air handler (10), the control device (30) changes at least one of a to-be-supplied air temperature and an air flow rate of the outdoor air handler (10). Thus, the air conditioning capacity of the outdoor air handler (10) changes as a result of the change in at least one of the to-be-supplied air temperature and the air flow rate of the outdoor air handler (10).

In the air-conditioning system (100) according to the present embodiment, in the case where the outdoor air handler (10) and the air conditioner (20) perform an identical operation that is the cooling operation or the heating operation, when the air conditioner (20) is in the non-temperature adjusting state, the control device (30) increases the air conditioning capacity of the outdoor air handler (10), compared with the case where the outdoor air handler (10) and the air conditioner (20) are in the temperature adjusting state, such that the smaller of the load processing capacity of the air conditioner (20) in the temperature adjusting state and the surplus capacity of the outdoor air handler (10) is compensated for. Thus, if the load processing capacity of the air conditioner (20) in the temperature adjusting state is smaller than the surplus capacity of the outdoor air handler (10), the air conditioning capacity of the outdoor air handler (10) is increased such that the load processing capacity of the air conditioner (20) in the temperature adjusting state is compensated for. On the other hand, if the surplus capacity of the outdoor air handler (10) is smaller than the load processing capacity of the air conditioner (20) in the temperature adjusting state, the air conditioning capacity of the outdoor air handler (10) is increased such that the surplus capacity of the outdoor air handler (10) is compensated for. Consequently, an excessive load on the outdoor air handler (10) can be avoided.

In the air-conditioning system (100) according to the present embodiment, in the case where one of the outdoor air handler (10) and the air conditioner (20) is in the non-temperature adjusting state, when the difference ($\Delta T$) between the temperature in the target space (SP1, SP2) and the temperature target value is greater than or equal to the predetermined temperature threshold (Th), even after the non-temperature adjusting state of the one of the outdoor air handler (10) and the air conditioner (20) ends, the control device (30) maintains the changed air conditioning capacity of the other one of the outdoor air handler (10) and the air conditioner (20) until the difference (ΔT) between the temperature in the target space (SP1, SP2) and the temperature target value becomes less than the temperature threshold (Th). Thus, even after the non-temperature adjusting state of the one of the outdoor air handler (10) and the air conditioner (20) ends, if the difference (ΔT) between the temperature in the target space (SP1, SP2) and the temperature target value is large, the changed air conditioning capacity of the other one is maintained until the difference (ΔT) becomes less than the predetermined temperature threshold (Th). Consequently, after the non-temperature adjusting state of the one of the outdoor air handler (10) and the air conditioner (20) ends, the temperature in the target space (SP1, SP2) can be made close to the temperature target value in a short time.

In the air-conditioning system (100) according to the present embodiment, in the case where the air conditioner (20) is in the non-temperature adjusting state, the control device (30) changes at least one of the to-be-supplied air temperature and the air flow rate of the outdoor air handler (10) such that the temperature in the target space (SP1, SP2) approaches the temperature target value. Thus, by changing at least one of the to-be-supplied air temperature and the air flow rate of the outdoor air handler (10), the temperature in the target space (SP1, SP2) can be made close to the temperature target value. For example, it is considered that the to-be-supplied air temperature of the outdoor air handler (10) is increased in the case where the temperature in the target space (SP1, SP2) is lower than the temperature target value.

In the air-conditioning system (100) according to the present embodiment, in the case where the outdoor air handler (10) and the air conditioner (20) perform an identical operation that is the cooling operation or the heating operation, when the outdoor air handler (10) is in the non-temperature adjusting state, the control device (30) increases the air conditioning capacity of the air conditioner (20) compared with the case where the outdoor air handler (10) and the air conditioner (20) are in the temperature adjusting state. Thus, in response to the outdoor air handler (10) entering the non-temperature adjusting state, the air conditioning capacity of the air conditioner (20) increases compared with the case where both the outdoor air handler (10) and the air conditioner (20) are in the temperature adjusting state. Consequently, a shortage of the air conditioning capacity caused as a result of the outdoor air handler (10) entering the non-temperature adjusting state is partially or entirely compensated for by the air conditioner (20).

In the air-conditioning system (100) according to the present embodiment, after the non-temperature adjusting state of the outdoor air handler (10) ends, the control device (30) returns the air conditioning capacity of the air conditioner (20) to the air conditioning capacity set before the increase. Thus, after the non-temperature adjusting state of the outdoor air handler (10) ends, an operating state of the air conditioner (20) is returned to an operating state set in the case where both the outdoor air handler (10) and the air conditioner (20) are in the temperature adjusting state. Consequently, unnecessary power consumption can be suppressed.

In the air-conditioning system (100) according to the present embodiment, the air conditioner (20) includes the indoor heat exchanger (22a) and the indoor fan (22c) configured to send the air in the target space (SP1, SP2) to the indoor heat exchanger (22a), and the control device (30) increases the air conditioning capacity of the air conditioner (20) by changing at least one of the air flow rate of the indoor fan (22c) and the evaporation temperature or the condensation temperature in the indoor heat exchanger (22a). Thus, the air conditioning capacity of the air conditioner (20) increases as a result of the change in at least one of the air flow rate of the indoor fan (22c) and the evaporation temperature or the condensation temperature in the indoor heat exchanger (22a).

In the air-conditioning system (100) according to the present embodiment, in the case where the outdoor air handler (10) and the air conditioner (20) perform the identical operation that is the cooling operation or the heating operation, when the outdoor air handler (10) is in the non-temperature adjusting state, the control device (30) increases the air conditioning capacity of the air conditioner (20), compared with the case where the outdoor air handler (10) and the air conditioner (20) are in the temperature adjusting state, such that the smaller of the load processing capacity of the outdoor air handler (10) in the temperature adjusting state and the surplus capacity of the air conditioner (20) is compensated for. Thus, if the load processing capacity of the outdoor air handler (10) in the temperature adjusting state is smaller than the surplus capacity of the air conditioner (20), the air conditioning capacity of the air conditioner (20) is increased such that the load processing capacity of the outdoor air handler (10) in the temperature adjusting state is compensated for. On the other hand, if the surplus capacity of the air conditioner (20) is smaller than the load processing capacity of the outdoor air handler (10) in the temperature adjusting state, the air conditioning capacity of the air conditioner (20) is increased such that the surplus capacity of the air conditioner (20) is compensated for. Consequently, an excessive load on the air conditioner (20) can be avoided.

In the air-conditioning system (100) according to the present embodiment, in the case where the outdoor air handler (10) is in the non-temperature adjusting state, when the difference (ΔT) between the temperature in the target space (SP1, SP2) and the temperature target value is greater than or equal to the predetermined temperature threshold (Th), even after the non-temperature adjusting state of the outdoor air handler (10) ends, the control device (30) maintains the increased air conditioning capacity of the air conditioner (20) until the difference (ΔT) between the temperature in the target space (SP1, SP2) and the temperature target value becomes less than the temperature threshold (Th). Thus, even after the non-temperature adjusting state of the outdoor air handler (10) ends, if the difference (ΔT) between the temperature in the target space (SP1, SP2) and the temperature target value is large, the increased air conditioning capacity of the air conditioner (20) is maintained until the difference (ΔT) becomes less than the predetermined temperature threshold (Th). Consequently, after the non-temperature adjusting state of the outdoor air handler (10) ends, the temperature in the target space (SP1, SP2) can be made close to the temperature target value in a short time.

In the air-conditioning system (100) according to the present embodiment, in the case where the temperature in the target space (SP1, SP2) is higher than the temperature target value by a predetermined value or more during heating or in the case where the temperature in the target space (SP1, SP2) is lower than the temperature target value by the predetermined value or more during cooling, the control device (30) does not increase the air conditioning capacity of the air conditioner (20). Thus, in the case where air conditioning is appropriately performed in the target space (SP1, SP2), the air conditioning capacity of the air conditioner (20) is not increased even when the outdoor air handler (10) enters the non-temperature adjusting state. Consequently, excessive cooling or heating in the target space (SP1, SP2) can be avoided.

In the air-conditioning system (100) according to the present embodiment, in the case where the outdoor air handler (10) and the air conditioner (20) respectively perform one of the cooling operation and the heating operation and the other one of the cooling operation and the heating operation, when one of the outdoor air handler (10) and the air conditioner (20) is in the non-temperature adjusting state, the control device (30) decreases the air conditioning capacity of the other one of the outdoor air handler (10) and the air conditioner (20) compared with the case where the outdoor air handler (10) and the air conditioner (20) are in the temperature adjusting state. Thus, in response to the one of the outdoor air handler (10) and the air conditioner (20) entering the non-temperature adjusting state, the air conditioning capacity of the other one decreases compared with the case where both are in the temperature adjusting state. Consequently, excessive cooling or heating in the target space (SP1, SP2) as a result of the one of the outdoor air handler (10) and the air conditioner (20) entering the non-temperature adjusting state can be avoided.

In the air-conditioning system (100) according to the present embodiment, in the case where the outdoor air handler (10) and the air conditioner (20) respectively perform one of the cooling operation and the heating operation and the other one of the cooling operation and the heating operation, when the air conditioner (20) is in the non-temperature adjusting state, the control device (30) decreases the air conditioning capacity of the outdoor air handler (10) compared with the case where the outdoor air handler (10) and the air conditioner (20) are in the temperature adjusting state, and after the non-temperature adjusting state of the air conditioner (20) ends, returns the air conditioning capacity of the outdoor air handler (10) to the air conditioning capacity set before the decrease. Thus, in response to the air conditioner (20) entering the non-temperature adjusting state, the air conditioning capacity of the outdoor air handler (10) decreases compared with the case where both the outdoor air handler (10) and the air conditioner (20) are in the temperature adjusting state. After the non-temperature adjusting state of the air conditioner (20) ends, the air conditioning capacity of the outdoor air handler (10) returns to the original.

In the air-conditioning system (100) according to the present embodiment, in the case where the air conditioning capacity of the outdoor air handler (10) is decreased, the to-be-supplied air temperature of the outdoor air handler (10) is changed or the air flow rate of the outdoor air handler (10) is decreased. Thus, the air conditioning capacity of the outdoor air handler (10) decreases as a result of the change in the to-be-supplied air temperature of the outdoor air handler (10) or the decrease in the air flow rate of the outdoor air handler (10).

In the air-conditioning system (100) according to the present embodiment, in the case where the outdoor air handler (10) and the air conditioner (20) respectively perform one of the cooling operation and the heating operation and the other one of the cooling operation and the heating operation, when the outdoor air handler (10) is in the non-temperature adjusting state, the control device (30) decreases the air conditioning capacity of the air conditioner (20) compared with the case where the outdoor air handler (10) and the air conditioner (20) are in the temperature adjusting state, and after the non-temperature adjusting state of the outdoor air handler (10) ends, returns the air conditioning capacity of the air conditioner (20) to the air conditioning capacity set before the decrease. Thus, in response to the outdoor air handler (10) entering the non-temperature adjusting state, the air conditioning capacity of the air conditioner (20) decreases compared with the case where both the outdoor air handler (10) and the air conditioner (20) are in the temperature adjusting state. After the non-temperature adjusting state of the outdoor air handler (10) ends, the air conditioning capacity of the air conditioner (20) returns to the original.

In the air-conditioning system (100) according to the present embodiment, the air conditioner (20) includes the indoor heat exchanger (22a) and the indoor fan (22c) configured to send the air in the target space (SP1, SP2) to the indoor heat exchanger (22a), and the control device (30) decreases the air conditioning capacity of the air conditioner (20) by changing at least one of the air flow rate of the indoor fan (22c) and the evaporation temperature or the condensation temperature in the indoor heat exchanger (22a). Thus, the air conditioning capacity of the air conditioner (20) decreases as a result of the change in at least one of the air flow rate of the indoor fan (22c) and the evaporation temperature or the condensation temperature in the indoor heat exchanger (22a).

Modification of Embodiment 1

A modification of Embodiment 1 will be described. The present modification differs from Embodiment 1 described above in that the control device (30) increases the air flow rate of the outdoor air handler (10) in the case where a temperature adjusting capacity of the outdoor air handler (10) for the target space (SP1, SP2) (that is, a capacity of processing a cooling load or a heating load in the target space (SP1, SP2)) is to be increased by increasing the air flow rate of the outdoor air handler (10) compared with the case where the control device (30) does not increase the air flow rate. Differences from Embodiment 1 described above will be mainly described below.

Figure 4:
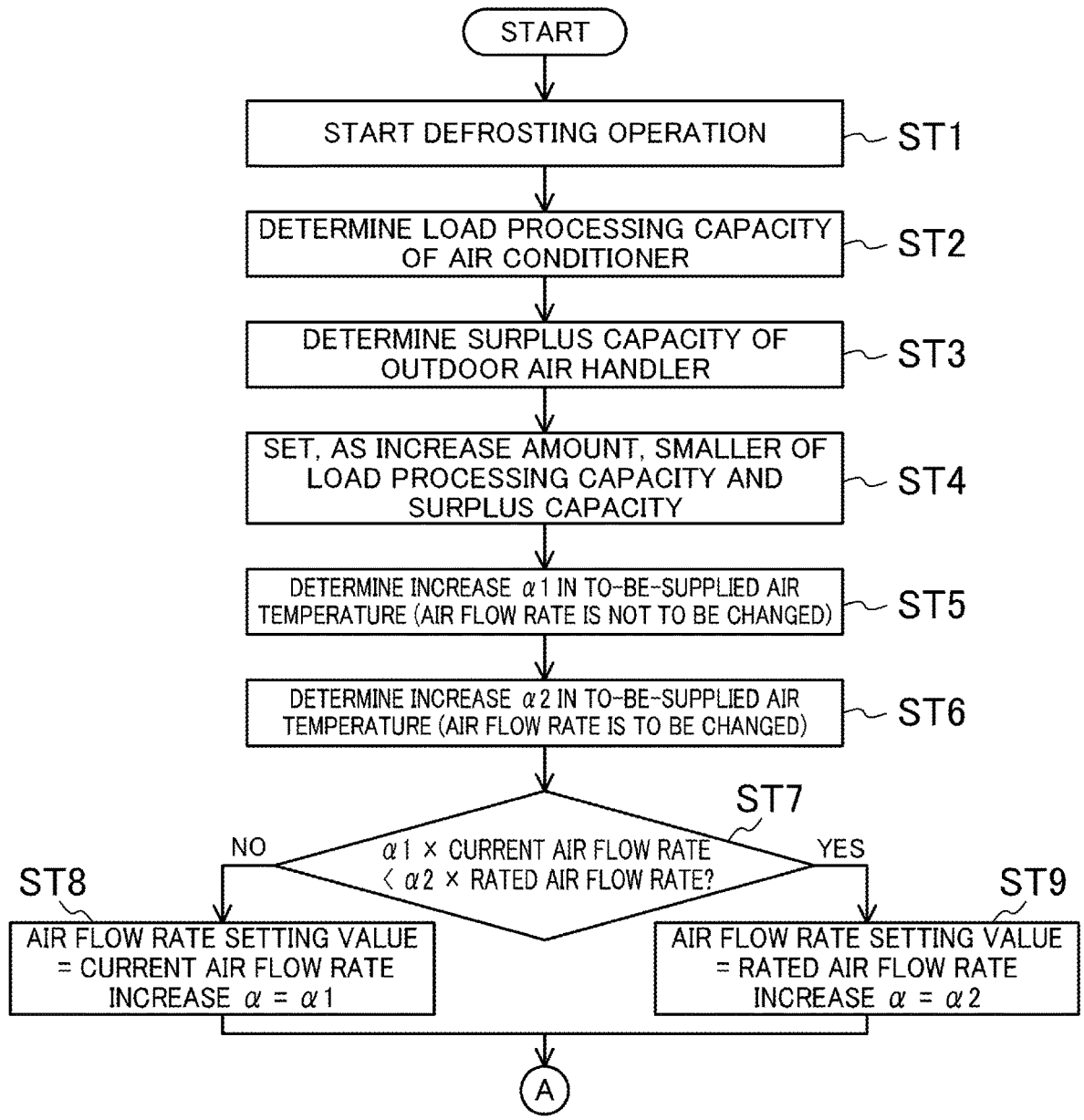
FIG. 4 is a flowchart for describing another example of the control operation of the air-conditioning system.
Figure 5:
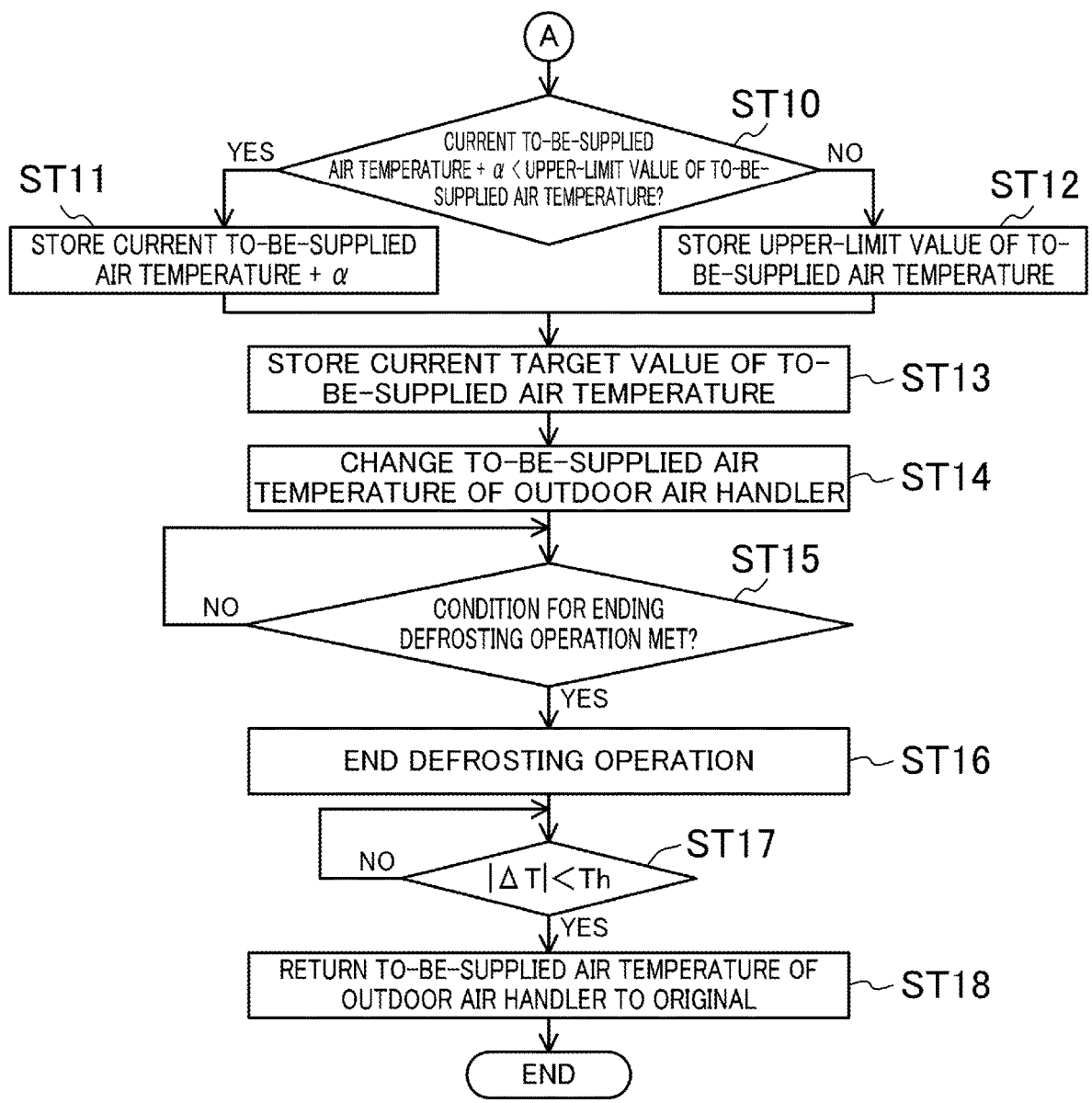
FIG. 5 is a flowchart for describing the other example of the control operation of the air-conditioning system.

FIGS. 4 and 5 are flowcharts for describing a specific operation performed in the case where the air conditioner (20) enters the non-temperature adjusting state from the temperature adjusting state in the common operation in which the outdoor air handler (10) and the air conditioner (20) perform the heating operation. The flowcharts of FIGS. 4 and 5 assume, as the initial state, a state in which the outdoor air handler (10) and the air conditioner (20) are in the temperature adjusting state.

In steps ST5 to ST9 of the flowcharts of FIG. 4, it is determined whether to increase the air flow rate of the outdoor air handler (10). Steps ST1 to ST4 of FIG. 4 respectively correspond to steps ST1 to ST4 of FIG. 3, and steps ST10 to ST18 of FIG. 5 respectively correspond to steps ST6 to ST14 of FIG. 3. Thus, description is omitted here.

In step ST5, the control device (30) determines an increase α1 in the to-be-supplied air temperature of the outdoor air handler (10) in the case where the air flow rate of the outdoor air handler (10) is not to be changed. This increase α1 can be determined on the basis of the increase amount of the air conditioning capacity of the outdoor air handler (10) set in step ST4 and the current air flow rate of the outdoor air handler (10). The process then proceeds to step ST6.

In step ST6, the control device (30) determines an increase α2 in the to-be-supplied air temperature of the outdoor air handler (10) in the case where the air flow rate of the outdoor air handler (10) is to be increased. This increase α2 can be determined on the basis of the increase amount of the air conditioning capacity of the outdoor air handler (10) set in step ST4, the current air flow rate of the outdoor air handler (10), a rated air flow rate of the outdoor air handler (10), the to-be-supplied air temperature of the outdoor air handler (10), and the outdoor air temperature.

In step ST7, the control device (30) determines whether a product of the increase α1 and the current air flow rate of the outdoor air handler (10) is smaller than a product of the increase α2 and the rated air flow rate of the outdoor air handler (10). To make the normal to-be-supplied air temperature to be substantially equal to the indoor temperature, the product of the increase α1 and the current air flow rate and the product of the increase α2 and the rated air flow rate are proportional to a heating capacity for heating to the indoor temperature or higher. Thus, if the former value is not smaller than the latter value, the process proceeds to step ST8; otherwise, the process proceeds to step ST9.

In step ST8, the control device (30) sets the target value of the air flow rate of the outdoor air handler (10) to the current air flow rate of the outdoor air handler (10) and sets the increase α in the to-be-supplied air temperature of the outdoor air handler (10) to the aforementioned increase α1. The process then proceeds to step ST10.

On the other hand, in step ST9, the control device (30) sets the target value of the air flow rate of the outdoor air handler (10) to the rated air flow rate of the outdoor air handler (10) and sets the increase a in the to-be-supplied air temperature of the outdoor air handler (10) to the aforementioned increase α2. The process then proceeds to step ST10.

Advantages of Modification of Embodiment 1

Advantages similar to those of Embodiment 1 described above can be obtained by the air-conditioning system (100) according to the present modification.

In the air-conditioning system (100) according to the present modification, in the case where the temperature adjusting capacity of the outdoor air handler (10) for the target space (SP1, SP2) is to be increased by increasing the air flow rate of the outdoor air handler (10) compared with the case where the air flow rate is not increased, the control device 30 increases the air flow rate of the outdoor air handler (10). That is, in the case where increasing the air flow rate of the outdoor air handler (10) is effective from the viewpoint of temperature adjustment in the target space (SP1, SP2), the control device (30) increases the air flow rate of the outdoor air handler (10). On the other hand, there may be a case where increasing the air flow rate of the outdoor air handler (10) oppositely affects temperature adjustment in the target space (SP1, SP2). In such a case, the control device (30) does not increase the air flow rate of the outdoor air handler (10). Consequently, the air flow rate of the outdoor air handler (10) can be optimally controlled.

Other Embodiments

The embodiment described above may be configured as follows.

—First Modification—

For example, in the case where the air conditioner (20) is in the non-temperature adjusting state, the control device (30) may cause the outdoor air handler (10) to operate on the basis of return-air temperature control or indoor temperature control. Each of the return-air temperature control and the indoor temperature control refers to controlling the temperature (indoor temperature) of the air in the target space (SP1, SP2) on the basis of feedback control. In this case, for example, a quantity to be controlled is the return-air temperature or the indoor temperature, and a quantity to be operated is the to-be-supplied air temperature or the air flow rate of the outdoor air handler (10).

—Second Modification—

For example, in the case where the outdoor air handler (10) performs a heating humidifying operation (humidification is performed in the heating operation) and the air conditioner (20) performs the heating operation, when the air conditioner (20) is in the non-temperature adjusting state, the control device (30) may decrease a humidifying capacity of the outdoor air handler (10) (specifically, decrease an intake amount of water of the humidifier (13)) and may increase the to-be-supplied air temperature of the outdoor air handler (10), compared with the case where the outdoor air handler (10) and the air conditioner (20) are in the temperature adjusting state. In this case, in response to the air conditioner (20) entering the non-temperature adjusting state, the control device (30) controls the outdoor air handler (10) such that the heating capacity is prioritized over the humidifying capacity. Consequently, a deterioration in a temperature environment of the target space (SP1, SP2) as a result of the air conditioner (20) entering the non-temperature adjusting state can be suppressed.

—Third Modification—

For example, the outdoor air handler (10) may include a plurality of heat source units (chiller units). Even in the case where the air conditioner (20) is in the non-temperature adjusting state, the control device (30) does not increase the air conditioning capacity of the outdoor air handler (10) when all the heat source units are operating. As described above, in the case where all the heat source units are operating, the control device (30) does not increase the air conditioning capacity of the outdoor air handler (10) by presuming that the outdoor air handler (10) substantially no surplus capacity. Consequently, an excessive load on the outdoor air handler (10) can be avoided.

—Fourth Modification—

For example, the air conditioner (20) may be configured to be able to perform the heating humidifying operation. In the case where the outdoor air handler (10) and the air conditioner (20) perform the heating humidifying operation, when the outdoor air handler (10) is in the non-temperature adjusting state, the control device (30) may decrease the humidifying capacity of the air conditioner (20) and increase the condensation temperature in the indoor heat exchanger (22a) of the air conditioner (20) compared with the case where the outdoor air handler (10) and the air conditioner (20) are in the temperature adjusting state. In this case, in response to the outdoor air handler (10) entering the non-temperature adjusting state, the control device (30) controls the air conditioner (20) such that the heating capacity is prioritized over the humidifying capacity. Consequently, a deterioration in a temperature environment of the target space (SP1, SP2) as a result of the outdoor air handler (10) entering the non-temperature adjusting state can be suppressed.

—Fifth Modification—

For example, in the case where one of the outdoor air handler (10) and the air conditioner (20) is in the non-temperature adjusting state, the control device (30) may change an environment target value such that the air conditioning load of the air-conditioning system (100) becomes lower than an air conditioning load in the case where the outdoor air handler (10) and the air conditioner (20) are in the temperature adjusting state. Specifically, the environment target value may be a temperature target value (the target value of the temperature in the target space (SP1, SP2)), a humidity target value (the target value of the humidity in the target space (SP1, SP2)), or a $CO_2$ concentration target value (the target value of the $CO_2$ concentration in the target space (SP1, SP2)). For example, the control device (30) may change the temperature target value to decrease the cooling load or the heating load of the air-conditioning system (100), may change the humidity target value to decrease a dehumidifying load or a humidifying load of the air-conditioning system (100), or may increase the $CO_2$ concentration target value to decrease a ventilating load of the outdoor air handler (10). Consequently, an excessive load on the outdoor air handler (10) and the air conditioner (20) can be avoided.

While the embodiments and modifications have been described above, it should be understood that various modifications can be made on the configurations and details without departing from the gist and the scope of the claims. The embodiments and modifications described above may be combined or replaced as appropriate as long as the functionality of the target of the present disclosure is not reduced.

INDUSTRIAL APPLICABILITY

As described above, the present disclosure is useful for an air-conditioning system.

REFERENCE SIGNS LIST 10 outdoor air handler
20 air conditioner
22a indoor heat exchanger
22c indoor fan
30 control device (control unit)
100 air-conditioning system
SP1, SP2 target space
Th temperature threshold
ΔT (temperature) difference

The invention claimed is:

1. An air-conditioning system (100) comprising:
an outdoor air handler (10) configured to adjust a temperature and a humidity of taken-in outdoor air and supply the air to a target space (SP1, SP2);
an air conditioner (20) configured to adjust a temperature of air in the target space (SP1, SP2); and
a control unit (30) configured to control the outdoor air handler (10) and the air conditioner (20), wherein
each of the outdoor air handler (10) and the air conditioner (20) switches between a temperature adjusting state in which the temperature of the air is adjusted and a non-temperature adjusting state in which the temperature of the air is not adjusted,
the outdoor air handler (10) in the temperature adjusting state adjusts an air conditioning capacity of the outdoor air handler (10) such that the temperature of the air to be supplied to the target space (SP1,SP2) is to be a target value of a to-be-supplied air temperature, and
in a case where the outdoor air handler (10) and the air conditioner (20) perform a heating operation, when the outdoor air handler (10) is in the temperature adjusting state and the air conditioner (20) is in the non-temperature adjusting state, the control unit (30) sets the target value of the to-be-supplied air temperature of the outdoor air handler (10) to be higher than a target value set when the outdoor air handler (10) and the air conditioner (20) are in the temperature adjusting state.

2. The air-conditioning system according to claim 1, wherein
after the non-temperature adjusting state of the air conditioner (20) ends, the control unit (30) returns the target value of the to-be-supplied air temperature of the outdoor air handler (10) to a target value set before the change.

3. The air-conditioning system according to claim 1, wherein
in a case where a temperature adjusting capacity of the outdoor air handler (10) for the target space (SP1, SP2) is to be increased by increasing an air flow rate of the outdoor air handler (10) compared with a case where the air flow rate is not increased, the control unit (30) increases the air flow rate of the outdoor air handler (10).

4. The air-conditioning system according to claim 1, wherein
in the case where the outdoor air handler (10) and the air conditioner (20) perform the heating operation, when the air conditioner (20) is in the non-temperature adjusting state, the control unit (30) determines an increase amount in the target value of the to-be-supplied air temperature such that an increase amount in the air conditioning capacity of the outdoor air handler (10) is to be the smaller of a load processing capacity exhibited by the air conditioner (20) before the air conditioner (20) enters the non-temperature adjusting state and a current surplus capacity of the outdoor air handler (10).

5. The air-conditioning system according to claim 3, wherein
in the case where the outdoor air handler (10) and the air conditioner (20) perform the heating operation, when the air conditioner (20) is in the non-temperature adjusting state, the control unit (30) determines an increase amount in the target value of the to-be-supplied air temperature such that an increase amount in the air conditioning capacity of the outdoor air handler (10) is to be the smaller of a load processing capacity exhibited by the air conditioner (20) before the air conditioner (20) enters the non-temperature adjusting state and a current surplus capacity of the outdoor air handler (10).

6. The air-conditioning system according to claim 1, wherein
in the case where the air conditioner (20) is in the non-temperature adjusting state, when a difference (ΔT) between the temperature in the target space (SP1, SP2) and a temperature target value is greater than or equal to a predetermined temperature threshold (Th), even after the non-temperature adjusting state of the air conditioner (20) ends, the control unit (30) maintains the higher target value of the to-be-supplied air temperature of the outdoor air handler (10) until the difference (ΔT) between the temperature in the target space (SP1, SP2) and the temperature target value becomes less than the temperature threshold (Th).

* * * * *